US011831947B2

(12) United States Patent
Tian

(10) Patent No.: US 11,831,947 B2
(45) Date of Patent: Nov. 28, 2023

(54) VIDEO ANALYTICS CONFLICT DETECTION AND MITIGATION

(71) Applicant: MOTOROLA SOLUTIONS, INC., Chicago, IL (US)

(72) Inventor: Yong Tian, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 83 days.

(21) Appl. No.: 17/754,454

(22) PCT Filed: Oct. 15, 2019

(86) PCT No.: PCT/CN2019/111277
§ 371 (c)(1),
(2) Date: Apr. 1, 2022

(87) PCT Pub. No.: WO2021/072645
PCT Pub. Date: Apr. 22, 2021

(65) Prior Publication Data
US 2022/0337902 A1    Oct. 20, 2022

(51) Int. Cl.
*G06V 20/52*    (2022.01)
*H04N 21/44*    (2011.01)
(Continued)

(52) U.S. Cl.
CPC ..... *H04N 21/44008* (2013.01); *G06V 10/764* (2022.01); *G06V 20/46* (2022.01); *G06V 20/52* (2022.01)

(58) Field of Classification Search
CPC .................................................. G06V 20/52
See application file for complete search history.

(56) References Cited

U.S. PATENT DOCUMENTS 7,512,985 B1    3/2009 Grabarnik et al.
10,296,640 B1    5/2019 Liao et al.
(Continued)

FOREIGN PATENT DOCUMENTS

CN    110235138 A    9/2019
GB    2408881 A    6/2005

OTHER PUBLICATIONS

Chavan et al., "Occlusion detection in video sequences," IOSR Journal of Computer Engineering, 2014, vol. 16, Issue 5, pp. 01-08.
(Continued)

*Primary Examiner* — Brian T Pendleton
*Assistant Examiner* — Frank Johnson
(74) *Attorney, Agent, or Firm* — Michael Best & Friedrich LLP

(57) ABSTRACT

Systems and methods for identifying objects of interest in video streams associated with an incident. One system includes an electronic processor that receives a search attribute for an object associated with the incident and receives, from a primary video analytics system having a first video coverage capability associated with the incident, a video analytics policy for the first capability. The processor identifies a conflict between the attribute and the policy, and, in response, determines a plurality of secondary video analytics systems, each having a secondary video coverage capability. The processor, for each of the plurality of secondary systems: receives a secondary video analytics policy and determines whether a secondary conflict exists between the attribute and the policy, and, in response to determining that a conflict does not exist, transmits, to the secondary video analytics system, a request to apply the search attribute to a video stream of the secondary capability.

20 Claims, 5 Drawing Sheets

(51) Int. Cl.
  *G06V 20/40*   (2022.01)
  *G06V 10/764*  (2022.01)

(56) References Cited

U.S. PATENT DOCUMENTS

| | | |
|---|---|---|
| 2007/0239683 A1 | 10/2007 | Gallagher |
| 2008/0320550 A1 | 12/2008 | Strassner et al. |
| 2013/0076913 A1 | 3/2013 | Xu et al. |
| 2014/0023248 A1* | 1/2014 | Yoo .................. G08B 13/19686 |
| | | 382/118 |
| 2014/0328512 A1 | 11/2014 | Gurwicz et al. |
| 2015/0116487 A1 | 4/2015 | Ptitsyn |
| 2016/0155465 A1* | 6/2016 | Park ..................... G11B 20/005 |
| | | 386/241 |
| 2017/0300757 A1* | 10/2017 | Wolf ....................... H04N 23/80 |
| 2018/0181841 A1* | 6/2018 | Vendrig ............... H04N 23/661 |
| 2018/0253973 A1 | 9/2018 | Yang |
| 2019/0034716 A1* | 1/2019 | Kamarol ............. G06F 21/6245 |
| 2019/0068895 A1 | 2/2019 | Hutz et al. |
| 2019/0356506 A1* | 11/2019 | Beach ..................... G06V 10/84 |
| 2021/0233371 A1* | 7/2021 | Brake ..................... G06F 16/71 |
| 2021/0240851 A1* | 8/2021 | Badalone ................ G06F 21/60 |

OTHER PUBLICATIONS

International Search Report and Written Opinion for Application No. PCT/CN2019/111277 dated Jul. 16, 2020 (9 pages).

* cited by examiner

VIDEO ANALYTICS CONFLICT DETECTION AND MITIGATION

BACKGROUND OF THE INVENTION

Video capture devices (for example, security cameras) are deployed by property owners, government agencies, and others for security, investigation, traffic monitoring, weather monitoring, and for other purposes. Mobile video capture devices are also deployed, for example, in public-safety body worn cameras, mobile devices, public transit, automobiles, drones, and the like. Video captured by these devices is stored and analyzed by video analytics systems. Although they may be deployed for other purposes, video captured by the devices may include one or more objects of interest associated with a public safety incident. Objects of interest include people, vehicles, buildings, or portions of buildings, and other physical objects involved or potentially involved in the incident. Accordingly, public safety agencies may request video from the video analytics systems to assist them in their response to or investigation of the incident. The resulting video streams are produced according to video analytics policies, which are used by the video analytics systems to apply restrictions to the video capture devices. Video analytics policies can vary from system to system, and from device to device. The video streams provided by the video analytics systems may be used subsequent to the incident as evidence in criminal trials or other official investigations or proceedings, or for training purposes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
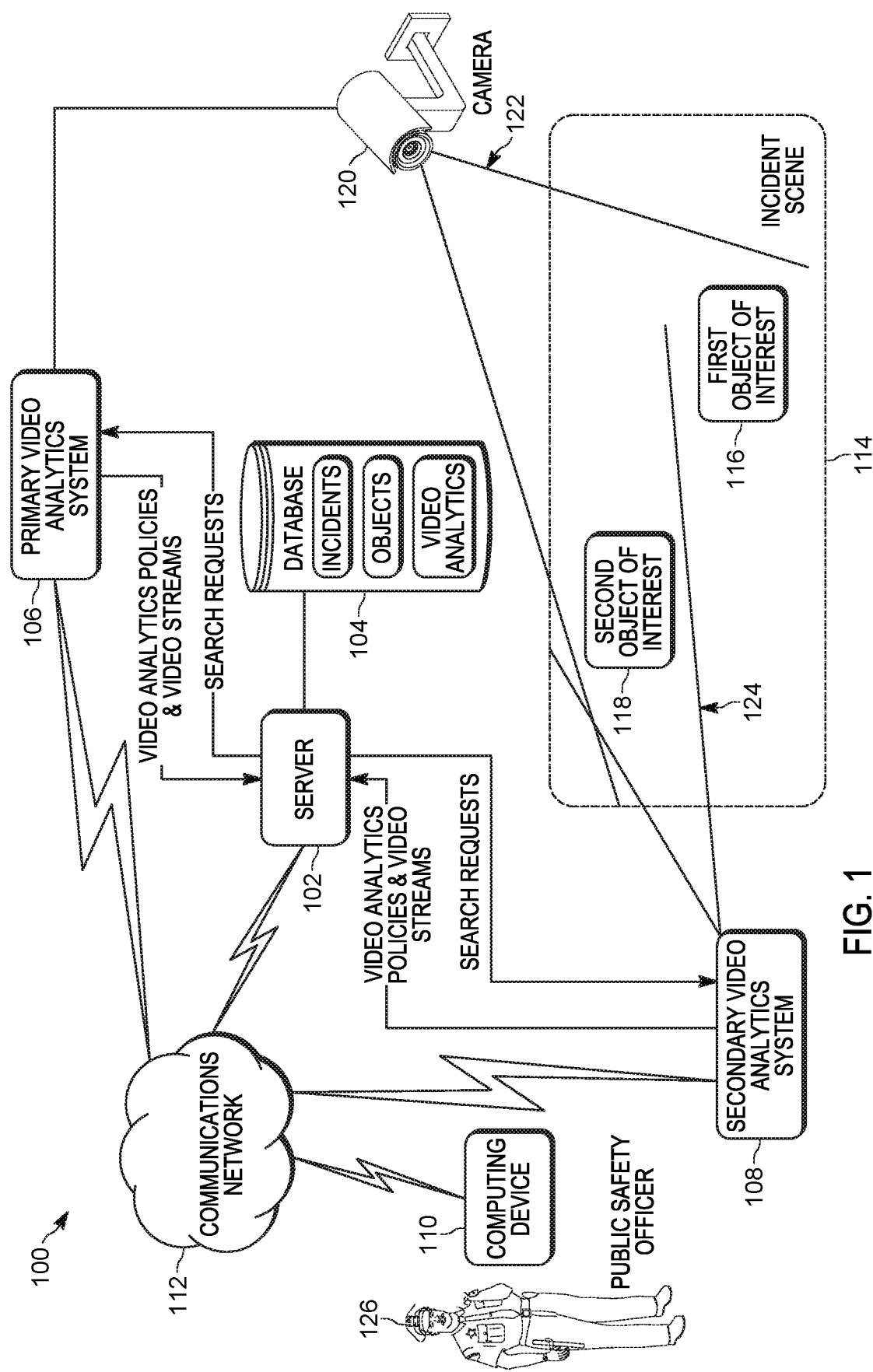
FIG. 1 is a diagram of a system for identifying objects of interest in video streams associated with an incident in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Collaborative video analytics systems, for example, as used by public safety agencies, are used to collect and analyze video streams from multiple sources to locate objects of interest. During incident response and investigation, potentially relevant video streams are requested from multiple video analytics systems. Such systems may also be queried for video streams including objects of interest. Some video analytics systems use video analytics policies to process captured video, store captured video, and provide video streams or other data to other systems (for example, in response to queries). Video analytics policies include restrictions, which are inherent to the captured video streams (for example, an obstructed field of view may inherently restrict what is captured by a particular device), or applied during or after capture (for example, faces of persons in a captured video stream may be digitally blurred to protect privacy at a healthcare facility). Video analytics policies may vary from system to system, and from device to device. As a consequence of the restrictions, search queries for video including relevant objects of interest may return false negatives.

The application of video analytics policies, and the resultant false negative responses, may cause investigators to misinterpret received video streams. For example, a police officer searching for a suspect at large may request a video stream that includes the suspect (in this example, the object of interest) from an area where the suspect was reportedly seen be transmitted to his squad computer. However, video analytics policies for the video stream may prevent the capture of video including the suspect, or may not produce applicable video in response to a query. This may lead the investigating officer to conclude that the intelligence provided on the suspect's whereabouts was incorrect, frustrating attempts to locate and apprehend the suspect. As a consequence, current systems for collaborative video analytics are unable to reliably identify whether or not objects of interest are present in collected video streams. To address this problem, embodiments described herein provide, among other things, systems and methods for detecting and mitigating conflicts in video analytics systems used to identify objects of interest in video streams associated with an incident. In order to reduce the production of false negatives, embodiments presented herein analyze search queries and video analytics policies prior to transmission of the queries to identify conflicts that may result in false negative responses.

One example embodiment provides a system for identifying objects of interest in video streams associated with an incident. The system includes an electronic processor configured to receive a search attribute for an object of interest associated with the incident. The electronic processor is configured to receive, from a primary video analytics system having a first video coverage capability associated with the incident, a video analytics policy including a video analytics restriction for the first video coverage capability. The electronic processor is configured to identify a policy conflict between the search attribute and the video analytics policy. The electronic processor is configured to, in response to identifying the policy conflict, determine a plurality of secondary video analytics systems, each of the plurality of second video analytics systems having a secondary video coverage capability associated with the incident. The electronic processor is configured to, for each of the plurality of secondary video analytics systems: receive a secondary video analytics policy for the secondary video coverage capability and determine whether a secondary policy conflict exists between the search attribute and the secondary video analytics policy. The electronic processor is configured to in response to determining that a secondary policy conflict does not exist, transmit, to the secondary video analytics system, a request to apply the search attribute to at least a portion of a video stream produced by the secondary video coverage capability.

Another example embodiment provides a method for identifying objects of interest in video streams associated with an incident. The method includes receiving, with an electronic processor, a search attribute for an object of interest associated with the incident. The method includes receiving, from a primary video analytics system having a first video coverage capability associated with the incident, a video analytics policy including a video analytics restriction for the first video coverage capability. The method includes identifying, with the electronic processor, a policy conflict between the search attribute and the video analytics policy. The method includes, in response to identifying the policy conflict, determining, with the electronic processor, a plurality of secondary video analytics systems, each of the plurality of second video analytics systems having a secondary video coverage capability associated with the incident. The method includes, for each of the plurality of secondary video analytics systems, receiving a secondary video analytics policy for the secondary video coverage capability. The method includes determining, with the electronic processor, whether a secondary policy conflict exists between the search attribute and the secondary video analytics policy. The method includes, in response to determining that a secondary policy conflict does not exist, transmitting, with a transceiver, to the secondary video analytics system, a request to apply the search attribute to at least a portion of a video stream produced by the secondary video coverage capability.

A non-transitory computer-readable medium including instructions executable by an electronic processor to perform a set of functions. The set of functions includes receiving, with an electronic processor, a search attribute for an object of interest associated with the incident. The set of functions includes receiving, from a primary video analytics system having a first video coverage capability associated with the incident, a video analytics policy including a video analytics restriction for the first video coverage capability. The set of functions includes identifying, with the electronic processor, a policy conflict between the search attribute and the video analytics policy. The set of functions includes, in response to identifying the policy conflict, retrieving, from the primary video analytics system, a first video stream based on the search attribute. The set of functions includes enabling presentation, on a display communicatively coupled to the electronic processor, of the first video stream augmented with a first alert message based on the policy conflict and an incident identifier for the incident.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 2:
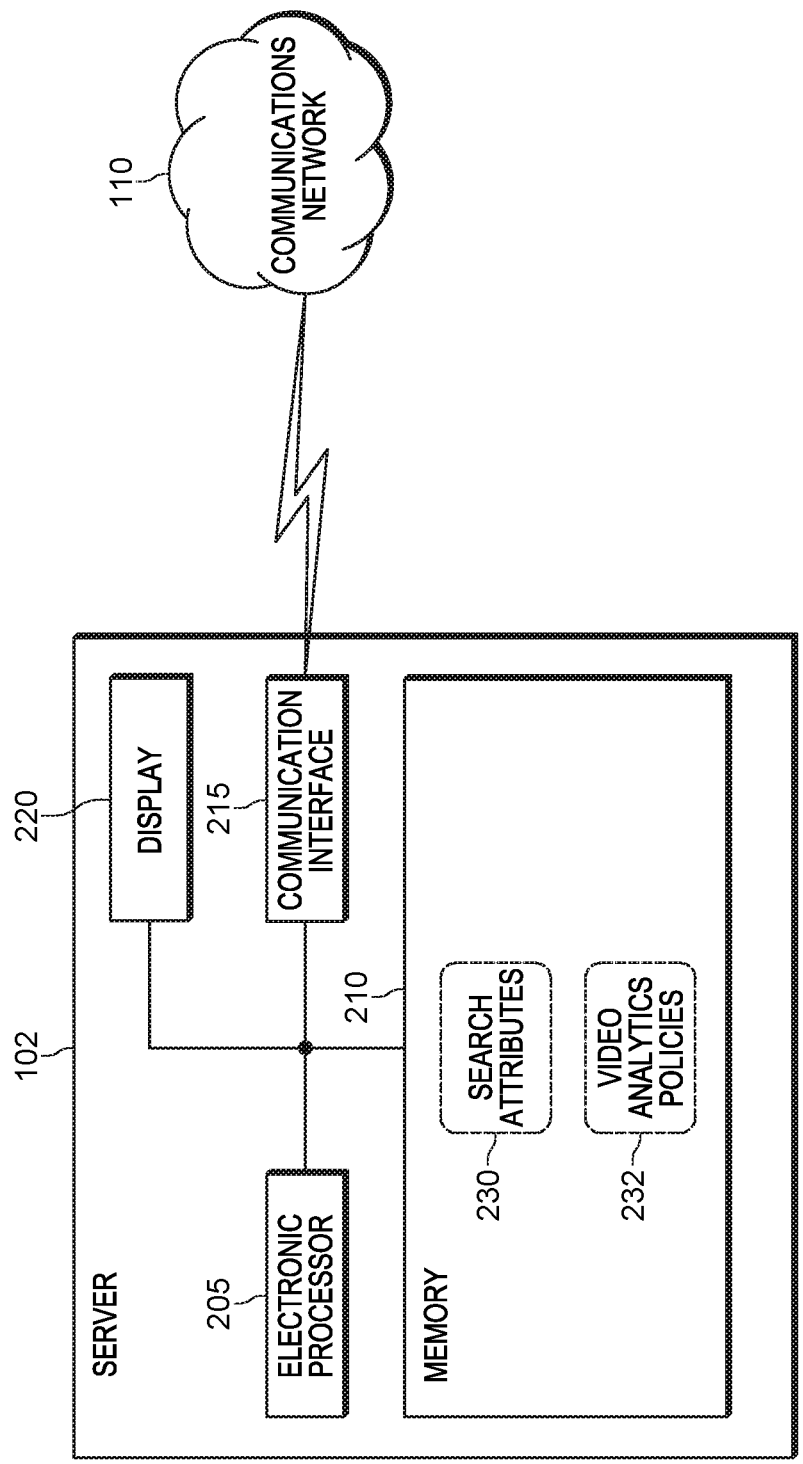
FIG. 2 is a diagram of a server of the system of FIG. 1 in accordance with some embodiments.

FIG. 1 illustrates an example collaborative video analytics system 100 for identifying objects of interest in video streams associated with an incident. In the example illustrated, the system 100 includes a server 102 and a database 104. The server 102, described more particularly below with respect to FIG. 2, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system external to the system 100 and accessible by the server 102 over one or more additional networks. In some embodiments, all or part of the database 104 may be locally stored on the server 102. In some embodiments, as described below, the database 104 electronically stores data on objects of interest (for example, the first object of interest 116 and the second object of interest 118, incidents (for example, public safety incidents), and video analytics systems and policies. In some embodiments, the server 102 and the database 104 are part of a computer-aided dispatch system.

The server 102 is communicatively coupled to a primary video analytics system 106, a secondary video analytics system 108, and a computing device 110 via a communications network 112. The communications network 112 is a communications network including wireless and wired connections. The communications network 112 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for Global Evolution (EDGE) network, a 3G network, a 4G network, 5G network, and combinations or derivatives thereof.

Embodiments of the system 100 may be used by public safety agencies (for example, police or fire departments) to respond to or investigate an incident. An incident may be a public safety operation, for example, responding to a crime, responding to a traffic accident, searching for a suspect, locating a missing person, responding to a fire, responding to a medical emergency, and the like. The incident or a response to the incident by public safety personnel may be recorded on video by the primary video analytics system 106 and the secondary video analytics system 108. The recorded video may capture video of objects of interest within the incident scene 114. For example, an incident may involve the first object of interest 116, the second object of interest 118, or both.

An object of interest may be any object present at the incident scene, which object is related to the incident. An object is related to the incident if it is involved in or relevant to the response to or investigation of the incident. Objects of interest may include, for example, automobiles (for example, in the case of a traffic accident), weapons (for example, in the case of a crime scene), people (for example, victims, suspects, or witnesses), buildings, or portions of buildings (for example, doors and windows). Objects of interest may also be tangible things not commonly thought of as objects, but which are still relevant to the response to or subsequent investigation of an incident response (for example, fluids leaked from automobiles, debris from damaged property, and blood). The incident scene 114 may include fewer or more than two objects of interest.

Video analytics systems (for example, the primary video analytics system 106 and the secondary video analytics system 108) include one or more video coverage capabilities. A video coverage capability includes at least one image capture device (for example, the camera 120) for capturing images and video streams by, for example, sensing light in at least the visible spectrum. It should be noted that the terms "image" and "images," as used herein, may refer to one or more digital images and, as used herein, may refer to still images or sequences of images (for example, a video).

Video coverage capabilities include video capture devices, for example, vehicle dash cameras, surveillance cameras, traffic cameras, body worn cameras, or another suitable image capture devices that record video of the incident scene 114 from fixed or movable positions. Video analytics systems (for example, the primary video analytics system 106 and the secondary video analytics system 108) include software and hardware to electronically detect and classify objects within images and video streams captured by their respective video coverage capabilities (for example, video processors and object classifier algorithms). As described in detail herein, public safety agencies responding to or investigating incidents may send search requests to video analytics systems requesting video streams that relevant to an incident or objects associated with an incident. For example, search requests may request video including a certain type of object, relating to a certain type of incident.

As noted, video streams are captured by video coverage capabilities. Video coverage capabilities are characterized (for example, in the database 104) by, among other things, their image capture capabilities (for example, resolution, frame rate, night vision capability, and the like), their locations, and their fields of view. For example, as shown in FIG. 1, the primary video analytics system 106 includes a video coverage capability provided by the camera 120, which has a field of view 122, in which can be seen a portion of the incident scene 114 that includes the first object of interest 116 and the second object of interest 118. The secondary video analytics system 108 includes a video coverage capability provided by another video capture device (not shown), which has a field of view 124, in which can be seen a portion of the incident scene 114 that includes the second object of interest 118. However, the field of view 122 does not permit the video coverage capability for the secondary video analytics system 108 to capture images of the first object of interest 116.

As described in detail herein, some video analytics systems operate according to video analytics policies. Video analytics policies determine how and when video streams are captured and processed, and include one or more video analytics restrictions for the systems' video coverage capabilities. One example of a video analytics restriction is a time restriction. For example, a video coverage capability may only be active during specified days and times. Another example of a video analytics restriction is a location restriction. For example, a video coverage capability may have a field of view that covers an incident scene, but release of the video is not permitted for some administrative reason. Another example of a video analytics restriction is a privacy restriction. For example, a camera at a healthcare facility may have a field of view that covers an incident scene. However, for privacy reasons, frames including human faces are removed, or the faces are blurred. Another example of a video analytics restriction is an obfuscated field of view. For example, a video coverage capability may have a field of view that covers an incident scene, but fog, snow, or other weather conditions may render some or all of the field of view unclear. In another example, the field of view for a video coverage capability may include portions of an adjacent property, which are digitally obscured. Another example of a video analytics restriction is an obstructed field of view. For example, a video coverage capability may have a field of view that covers an incident scene, but vehicles may temporarily block portions of the field of view. In another example, the field of view may include permanent obstructions, including natural obstacles (for example, vegetation, hills, and the like) and artificial obstacles (for example, signs, buildings, and the like). Another example of a video analytics restriction is an edge filtering function. A video coverage capability may have a field of view that covers an incident scene, but edge filtering functions may prevent the capture of video streams including an object of interest. For example, a video coverage capability may trigger recording only when certain types of movement or objects are detected. For example, a video coverage capability including a traffic camera may only record video streams when a vehicle is detected in motion. In another example, a video coverage capability including a security camera may only record video streams when an object classified as a human is detected in motion in a specific area. Another example of a video analytics restriction is a maintenance restriction. For example, a video coverage capability may have a field of view that covers an incident scene, but one or more capture devices may have been disabled for maintenance, and may have been malfunctioning at the time.

The primary video analytics system 106 and the secondary video analytics system 108 transmit their respective video analytics policies to the server 102, via the communications network 112. As described herein, the server 102 sends requests for video streams to the primary video analytics system 106 and the secondary video analytics system 108 based on, among other things, the video analytics policies.

In some embodiments, the server 102 also includes software and hardware to electronically detect and classify objects within images and video streams received from the primary video analytics system 106 and the secondary video analytics system 108. In some embodiments, the detected objects of interest are assigned object identifiers, and stored in the database 104.

In some embodiments, investigating officers (for example, public safety officer 126) can access the functions of the server 102 via the communications network 112 using the computing device 110 (for example, a laptop computer, a tablet computer, a smart telephone, and the like). The computing device 110 includes a suitable display or may operate to display information and video to the public safety officer 126 using a remote display, for example, a head-mounted display (HMD), an optical head-mounted display (OHMD), or the display of a pair of smart glasses. In some embodiments, some or all of the functions described as being performed by the server 102 may be performed on the computing device 110.

FIG. 2 illustrates the server 102 in more detail. In the example provided, the server 102 includes an electronic processor 205, a memory 210, a communication interface 215, and a display 220. The illustrated components, along with other various modules and components (not shown) are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, search attributes 230 and video analytics policies 232 (both described in detail herein).

The communication interface 215 is configured to receive input and to provide system output. The communication interface 215 obtains information and signals from, and provides information and signals to, (for example, over one or more wired and/or wireless connections) devices both internal and external to the server 102.

The display 220 is a suitable display such as, for example, a liquid crystal display (LCD) touch screen, or an organic light-emitting diode (OLED) touch screen. In some embodiments, the server 102 implements a graphical user interface (GUI) (for example, generated by the electronic processor 205, from instructions and data stored in the memory 210, and presented on the display 220), that enables a user to interact with the server 102. In some embodiments, the server 102 enables display remotely, for example, using a display of the computing device 110. In some embodiments, the server 102 operates using, among other things, augmented reality technology, where video streams are displayed (for example, on the display 220) with text, graphics, or graphical user interface elements superimposed on or otherwise combined with the video stream's images.

In some embodiments, the server 102 uses various machine learning methods to analyze the data stored in the database 104 and make determinations regarding the video analytics systems and policies. Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as, among other things, an intelligent system, an artificial intelligence (AI) system, or a cognitive system.

Figure 3:
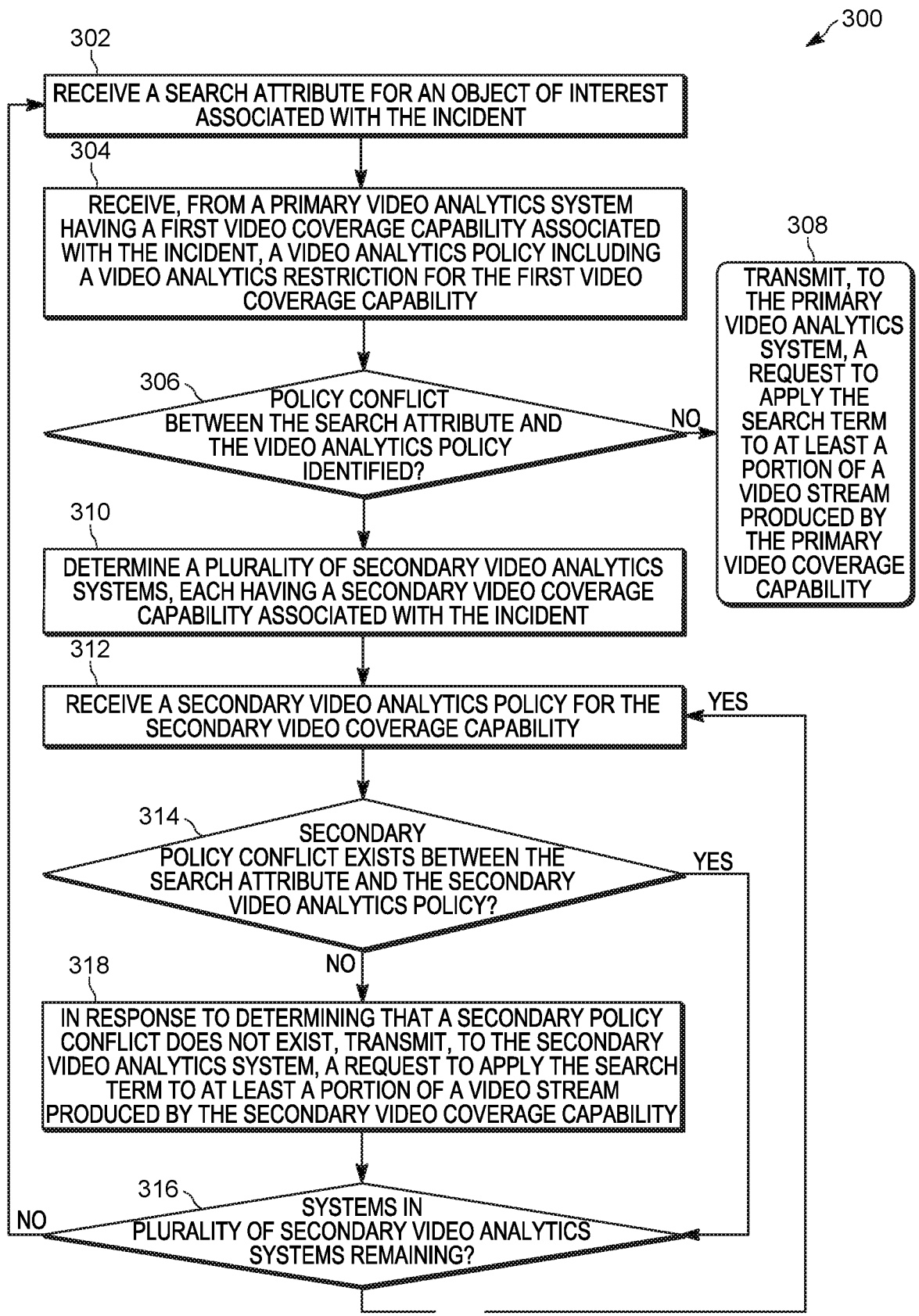
FIG. 3 is a flowchart of a method for identifying objects of interest in video streams associated with an incident in accordance with some embodiments.

As noted above, video analytics restrictions may result in video analytics systems returning false negatives in response to search queries from the server 102 for video including relevant objects of interest. Accordingly, FIG. 3 illustrates a method 300 for detecting and mitigating conflicts in video analytics systems to identify objects of interest in video streams associated with an incident. The method 300 is described as being performed by the server 102 and, in particular, the electronic processor 205. However, it should be understood that in some embodiments, portions of the method 300 may be performed by other devices, including for example, the primary video analytics system 106, the secondary video analytics system 108, and the computing device 110. For ease of description, portions of the method 300 are described in terms of a single object of interest (for example, the first object of interest 116) and one primary video analytics systems. It should be understood that embodiments of the method 300 may be used to identify multiple objects of interest using two or more video analytics systems.

As illustrated in FIG. 3, at block 302, the electronic processor 205 receives a search attribute for an object of interest associated with the incident. In some embodiments, the electronic processor 205 receives the search attribute via the communication interface 215 from a user input (for example, received from the computing device 110). In another example, the electronic processor 205 receives the search attribute from an automated system, such as a computer aided dispatch system. In another example, electronic processor 205 receives the search attribute from the database 104. A search attribute is used to request video streams matching the search attribute from video analytics systems. Example search attributes include an object type (for example, a person or a vehicle), an incident type (for example, a traffic accident), a predicted appearance time (for example, a range of time during which it is expected that an object may be present), and a predicted appearance venue (for example, a location or locations in which it is expected that an object may be present). A search attribute may also include an object identifier (for example, a unique identifier for a specific object) that can be used by the video analytics systems to search for a particular object of interest (for example, a specific person).

At block 304, the electronic processor 205 receives, from a primary video analytics system having a first video coverage capability associated with the incident, a video analytics policy. For example, the electronic processor 205 may query the database 104 to determine which video analytics systems have video coverage capabilities that include fields of view covering a portion of the incident scene, and request the applicable video analytics policy. The video analytics policy includes one or more video analytics restrictions for the first video coverage capability, as described above.

At block 306, the electronic processor 205 identifies a policy conflict, if such conflict exists, between the search attribute and the video analytics policy. For example, in some embodiments, the electronic processor 205 determines, based on the search attribute and the video analytics policy, an object likelihood score for the first video coverage capability. The object likelihood score is a numerical value (for example, a decimal number, an integer, or a percentile) that indicates the likelihood that a first video stream produced by the primary video analytics system using the first video coverage capability includes an image of the object of interest when the video analytics restriction is applied to the first video stream. For example, the higher the object likelihood score of a video coverage capability with respect to the object, the more likely it is video stream includes the object. For example, when the search attribute is an object type of suspect (a human) and the video analytics restriction is a privacy restriction that deletes frames including human faces, the object likelihood score would be set to the lowest score for the numerical scale being used.

In some embodiments, the electronic processor 205 identifies a policy conflict when the object likelihood score is below a likelihood threshold. In some embodiments, the threshold is an absolute threshold (for example, a score of 25% or below using a scale of 0-100% may indicate a conflict). In some embodiments, the threshold is a relative value, for example, indicative of how much lower one object likelihood score is than a median or average object likelihood score for video coverage capabilities with the same or similar video analytics restrictions.

In some embodiments, the video analytics policy includes a plurality of video analytics restrictions for the first video coverage capability. In such embodiments, the electronic processor 205 generates a likelihood score based on the search attribute and the video analytics restriction for each of the plurality of video analytics restrictions. The electronic processor 205 determines the object likelihood score for the first video coverage capability based on the likelihood scores for the plurality of video analytics restrictions. For example, the object likelihood score may be the average or median of the likelihood scores for the plurality of video analytics restrictions.

Optionally, in some embodiments, the electronic processor 205 assigns a weight to one or more of the likelihood scores for the plurality of video analytics restrictions. The weight is used to indicate how significant a particular video analytics restriction is, relative to other video analytics restrictions, to determining an object likelihood score. For example, edge filtering restrictions may be weighted more heavily that obscured field of view restrictions. In some embodiments, the electronic processor 205 may determine the weights using a machine learning algorithm (for example, a neural network or Bayes classifier). Regardless of how the weight is determined, the electronic processor 205 assigns assign a weight to each of the plurality of video analytics restrictions and determines a weighted likelihood score, for each of the plurality of video analytics restrictions, based on the likelihood score and the assigned weight. In such embodiments, the electronic processor 205 determines the object likelihood score for the first video coverage capability based on the weighted likelihood scores for the plurality of video analytics restrictions.

In some embodiments, the electronic processor 205 identifies the policy conflict using a machine learning model trained on historical search attributes and historical video streams produced by the primary and secondary video analytics systems. Using historical data, a machine learning model may be trained to identify which pairings of search attributes and video analytics restrictions result in video streams that do not include images of the objects indicated by the search attributes.

Regardless of the method employed to identify policy conflicts, if no policy conflict exists, at block 308, the electronic processor 205 transmits, to the primary video analytics system, a request to apply the search attribute to at least a portion of a video stream produced by the primary video coverage capability. For example, the server 102 may transmit a network message to the primary video analytics system 106 requesting video streams from the first video coverage capability that include a suspect matching the search attribute.

When a policy conflict is identified, at block 310, the electronic processor 205, in response to identifying the policy conflict, determines a plurality of secondary video analytics systems, each having a secondary video coverage capability associated with the incident. For example, the electronic processor 205 may query the database 104 for a list of systems that include video coverage capabilities that include fields of view covering some or all of the incident scene during the time the incident occurred.

At blocks 312-318, the electronic processor 205 analyzes each of the plurality of secondary video analytics systems to determine and request alternate video sources, which may be able to provide images of the object of interest.

At block 312, the electronic processor 205 receives a secondary video analytics policy for the secondary video coverage capability being analyzed, as described above with respect to the primary video analytics system. In some embodiments, the video analytics policies are retrieved when the electronic processor 205 determines the plurality of secondary video analytics systems.

At block 314, the electronic processor 205 determines whether a secondary policy conflict exists between the search attribute and the secondary video analytics policy (received at block 312), as described above with respect to the primary video analytics system.

When a secondary policy conflict exists, the electronic processor 205 continues to analyze the remainder of the plurality of secondary video analytics systems while unanalyzed systems remain (at blocks 312-316).

In response to determining that a secondary policy conflict does not exist (at block 318), the electronic processor 205 transmits, to the secondary video analytics system, a request to apply the search term to at least a portion of a video stream produced by the secondary video coverage capability.

As illustrated in FIG. 3, in some embodiments, when all of the plurality of secondary video analytics systems have been analyzed, the electronic processor 205 continues analyzing primary and secondary video analytics systems as new search requests are received.

Figure 4:
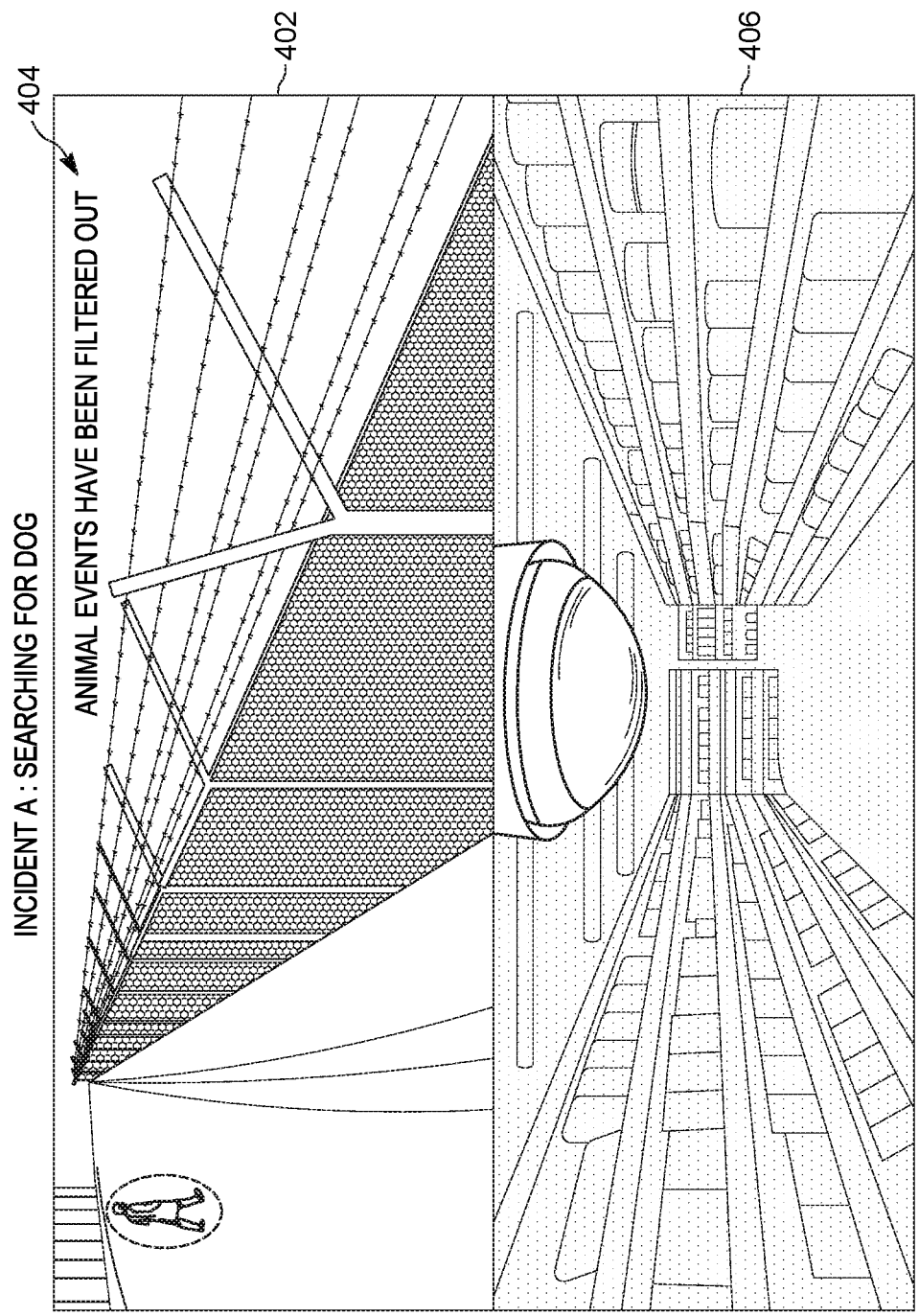
FIG. 4 is an example image produced by the system of FIG. 1 in accordance with some embodiments.

Optionally, or in addition, when the electronic processor 205 identifies a policy conflict or conflicts, the video stream is retrieved and displayed with an alert to provide context to a user analyzing the video stream. In such embodiments, the electronic processor 205, in response to identifying the policy conflict, retrieves, from the video analytics system (for example, the primary video analytics system 106), a first video stream based on the search attribute. For example, as illustrated in FIG. 4, a missing dog has been reported and video from locations where the dog may appear has been retrieved by the server 102. In this example, a video stream 402 is received from a video coverage capability that captures an area adjacent to a prison. The video analytics policy for the video coverage capability includes an edge filtering restriction, which will filter out animal crossings (for example, to prevent false positives being reported to prison security). The electronic processor 205 enables presentation (for example, on the display 220) of the video stream 402 augmented with an alert message 404 based on the policy conflict. In this example, the first alert message 404 warns that "animal events have been filtered out." Also illustrated in FIG. 4 is a video stream 406, which is received from a video coverage capability that captures video of a hospital pharmacy. The video analytics policy for the video coverage capability includes a privacy restriction, which will filter out patient's faces while the pharmacy is operating between 10:00 and 21:00. This presents no conflict when searching for a dog, so no conflict is identified. It is thus displayed without an alert.

Figure 5:
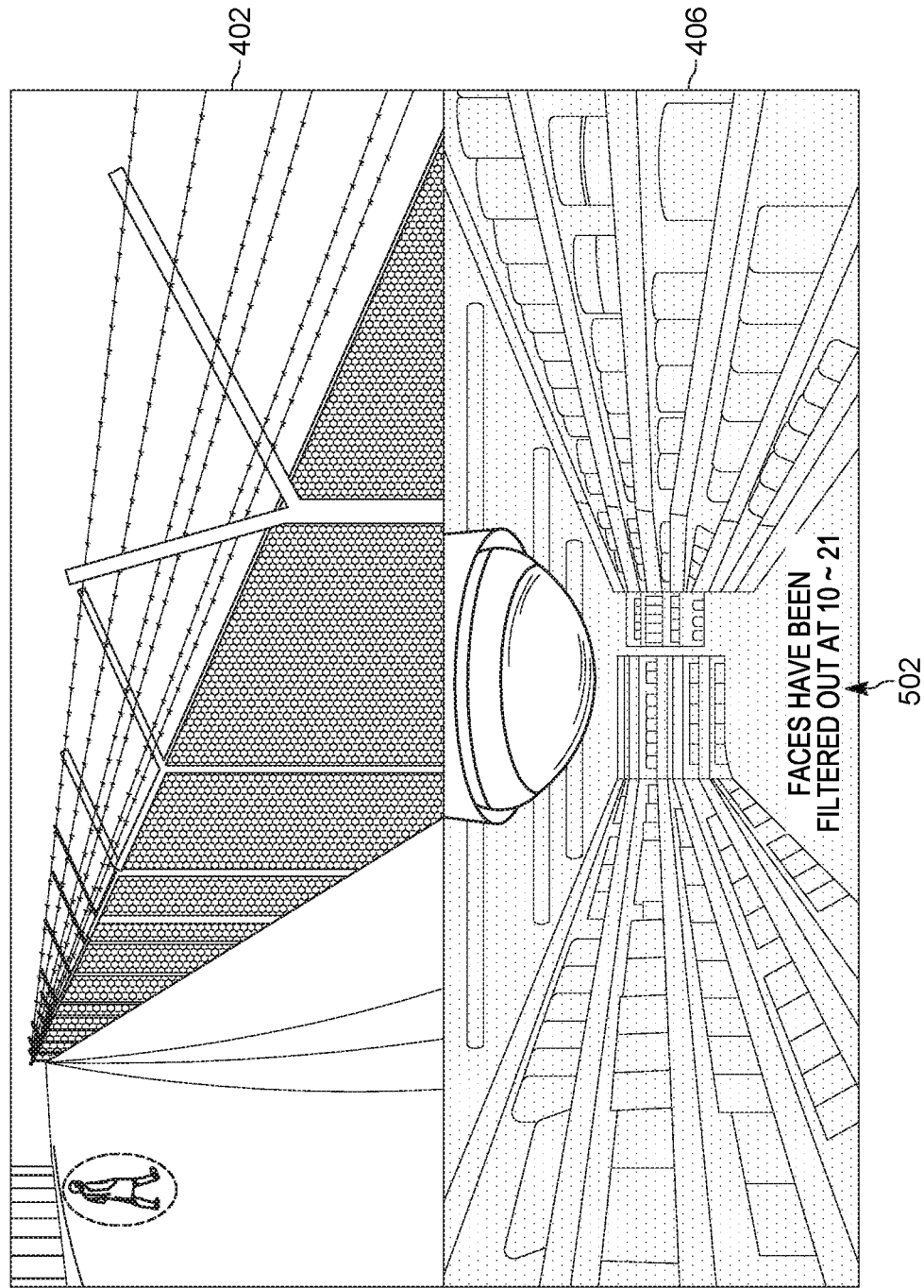
FIG. 5 is an example image produced by the system of FIG. 1 in accordance with some embodiments.

In another example, illustrated in FIG. 5, law enforcement is searching for a suspect using video streams from the same locations as FIG. 4. In this example, the privacy restriction on the video stream 406 is identified as a policy conflict. The electronic processor 205 therefore enables presentation (for example, on the display 220) of the video stream 406, augmented with an alert message 502 based on the policy conflict. In this example, the alert message 502 warns that "faces have been filtered out at 10-21." The edge filtering for video stream 402 presents no conflict when searching for a person, and thus it is displayed without an alert.

In some instances, a single video coverage capability may be associated with multiple incidents. In such instances, the electronic processor 205 receives, in addition to the first search attribute, a second search attribute for a second object of interest associated with a second incident. When the electronic processor 205 identifies a second policy conflict between the second search attribute and the video analytics policy, the electronic processor 205 enables presentation on the display of the first video stream, augmented with the first alert message and a second alert message based on the second policy conflict.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system for identifying objects of interest in video streams associated with an incident, the system comprising:
an electronic processor configured to
receive a search attribute for an object of interest associated with the incident;
receive, from a primary video analytics system having a first video coverage capability associated with the incident, a video analytics policy including a video analytics restriction for the first video coverage capability;
identify a policy conflict between the search attribute and the video analytics policy;
in response to identifying the policy conflict, determine a plurality of secondary video analytics systems, each of the plurality of second video analytics systems having a secondary video coverage capability associated with the incident; and for each of the plurality of secondary video analytics systems,
receive a secondary video analytics policy for the secondary video coverage capability;
determine whether a secondary policy conflict exists between the search attribute and the secondary video analytics policy; and
in response to determining that a secondary policy conflict does not exist, transmit, to the secondary video analytics system, a request to apply the search attribute to at least a portion of a video stream produced by the secondary video coverage capability.

2. The system of claim 1, wherein the electronic processor is configured to
determine, based on the search attribute and the video analytics policy, an object likelihood score for the first video coverage capability, the likelihood score indicative of the likelihood that a first video stream produced by the primary video analytics system using the first video coverage capability includes an image of the object of interest when the video analytics restriction is applied to the first video stream; and
identify the policy conflict when the object likelihood score is below a likelihood threshold.

3. The system of claim 2, wherein the video analytics policy includes a plurality of video analytics restrictions for the first video coverage capability and wherein the electronic processor is configured to:
for each of the plurality of video analytics restrictions, generate a likelihood score based on the search attribute and the video analytics restriction; and
determine the object likelihood score for the first video coverage capability based on the likelihood scores for the plurality of video analytics restrictions.

4. The system of claim 3, wherein the electronic processor is configured to:
assign a weight to each of the plurality of video analytics restrictions;
determine, for each of the plurality of video analytics restrictions, a weighted likelihood score based on the likelihood score and the weight; and
determine the object likelihood score for the first video coverage capability based on the weighted likelihood scores for the plurality of video analytics restrictions.

5. The system of claim 1, wherein the electronic processor is configured to identify the policy conflict using a machine learning model trained on historical search attributes and historical video streams produced by the primary and secondary video analytics systems.

6. The system of claim 1, wherein the search attribute is one selected from the group consisting of an object type, an incident type, a predicted appearance time, and a predicted appearance venue.

7. The system of claim 1, wherein the video analytics restriction is one selected from the group consisting of a time restriction, a location restriction, a privacy restriction, an obfuscated field of view, an obstructed field of view, an edge filtering function, and a maintenance restriction.

8. The system of claim 1, further comprising:
a display communicatively coupled to the electronic processor,
wherein the electronic processor is further configured to, in response to identifying the policy conflict,
retrieve, from the primary video analytics system, a first video stream based on the search attribute;
enabling presentation on the display of the first video stream augmented with a first alert message based on the policy conflict.

9. The system of claim 8, wherein the first video coverage capability is associated with a second incident and the electronic processor is configured to
receive a second search attribute for a second object of interest associated with the second incident;
identify a second policy conflict between the second search attribute and the video analytics policy; and
in response to identifying the second policy conflict, enabling presentation on the display of the first video stream, the first video stream augmented with the first alert message and a second alert message based on the second policy conflict.

10. A method for identifying objects of interest in video streams associated with an incident, the method comprising:
receiving, with an electronic processor, a search attribute for an object of interest associated with the incident;
receiving, from a primary video analytics system having a first video coverage capability associated with the incident, a video analytics policy including a video analytics restriction for the first video coverage capability;
identifying, with the electronic processor, a policy conflict between the search attribute and the video analytics policy;
in response to identifying the policy conflict, determining, with the electronic processor, a plurality of secondary video analytics systems, each of the plurality of second video analytics systems having a secondary video coverage capability associated with the incident; and
for each of the plurality of secondary video analytics systems,
receiving a secondary video analytics policy for the secondary video coverage capability;
determining, with the electronic processor, whether a secondary policy conflict exists between the search attribute and the secondary video analytics policy; and
in response to determining that a secondary policy conflict does not exist, transmitting, with a transceiver, to the secondary video analytics system, a request to apply the search attribute to at least a portion of a video stream produced by the secondary video coverage capability.

11. The method of claim 10, further comprising:
determining, based on the search attribute and the video analytics policy, an object likelihood score for the first video coverage capability, the likelihood score indicative of the likelihood that a first video stream produced by the primary video analytics system using the first video coverage capability includes an image of the object of interest when the video analytics restriction is applied to the first video stream; and
identifying the policy conflict when the object likelihood score is below a likelihood threshold.

12. The method of claim 11, wherein the method further comprises:
receiving, in the video analytics policy, a plurality of video analytics restrictions for the first video coverage capability;
for each of the plurality of video analytics restrictions, generating a likelihood score based on the search attribute and the video analytics restriction; and determining the object likelihood score for the first video coverage capability based on the likelihood scores for the plurality of video analytics restrictions.

13. The method of claim 12, further comprising:
assigning a weight to each of the plurality of video analytics restrictions;
determining, for each of the plurality of video analytics restrictions, a weighted likelihood score based on the likelihood score and the weight; and
determining the object likelihood score for the first video coverage capability based on the weighted likelihood scores for the plurality of video analytics restrictions.

14. The method of claim 10, wherein identifying the policy conflict includes using a machine learning model trained on historical search attributes and historical video streams produced by the primary and secondary video analytics systems.

15. The method of claim 10, wherein receiving the search attribute includes receiving one selected from the group consisting of an object type, an incident type, a predicted appearance time, and a predicted appearance venue.

16. The method of claim 10, wherein receiving the video analytics restriction includes receiving one selected from the group consisting of a time restriction, a location restriction, a privacy restriction, an obfuscated field of view, an obstructed field of view, an edge filtering function, and a maintenance restriction.

17. The method of claim 10, further comprising:
in response to identifying the policy conflict, retrieving, from the primary video analytics system, a first video stream based on the search attribute;
enabling presentation, on a display communicatively coupled to the electronic processor, of the first video stream augmented with a first alert message based on the policy conflict.

18. The method of claim 17, wherein the first video coverage capability is associated with a second incident and method further comprises:
receiving a second search attribute for a second object of interest associated with the second incident;
identifying a second policy conflict between the second search attribute and the video analytics policy; and
in response to identifying the second policy conflict, enabling presentation, on the display, of the first video stream augmented, the first video stream augmented with the first alert message and a second alert message based on the second policy conflict.

19. A non-transitory computer-readable medium including instructions executable by an electronic processor to perform a set of functions, the set of functions comprising:
receiving, with an electronic processor, a search attribute for an object of interest associated with an incident;
receiving, from a primary video analytics system having a first video coverage capability associated with the incident, a video analytics policy including a video analytics restriction for the first video coverage capability;
identifying, with the electronic processor, a policy conflict between the search attribute and the video analytics policy;
in response to identifying the policy conflict, retrieving, from the primary video analytics system, a first video stream based on the search attribute; and
enabling presentation, on a display communicatively coupled to the electronic processor, of the first video stream augmented with a first alert message based on the policy conflict and an incident identifier for the incident.

20. The non-transitory computer-readable medium of claim 19, wherein the set of instructions further comprises:
receiving a second search attribute for a second object of interest associated with a second incident;
identifying a second policy conflict between the second search attribute and the video analytics policy; and
in response to identifying the second policy conflict, enabling presentation, on the display, of the first video stream augmented, the first video stream augmented with the first alert message and a second alert message based on the second policy conflict and a second incident identifier for the second incident.

* * * * *